(12) United States Patent
Straub, Jr.

(10) Patent No.: US 7,917,321 B2
(45) Date of Patent: Mar. 29, 2011

(54) METHOD AND SYSTEM OF DETERMINING A PATTERN OF ARRIVAL TIME CYCLE SKIP IN AN ACOUSTIC FLOW METER

(75) Inventor: Henry Charles Straub, Jr., Houston, TX (US)

(73) Assignee: Daniel Measurement and Control, Inc., Houston, TX (US)

(*) Notice: Subject to any disclaimer, the term of this patent is extended or adjusted under 35 U.S.C. 154(b) by 391 days.

(21) Appl. No.: 12/036,500

(22) Filed: Feb. 25, 2008

(65) Prior Publication Data

US 2009/0216475 A1 Aug. 27, 2009

(51) Int. Cl.
*G01F 1/12* (2006.01)
(52) U.S. Cl. .......................................... 702/100
(58) Field of Classification Search .................. 702/100
See application file for complete search history.

(56) References Cited

U.S. PATENT DOCUMENTS

| | | | |
|---|---|---|---|
| 5,467,321 A | 11/1995 | Baumoel | |
| 5,650,571 A | 7/1997 | Freud | |
| 6,062,091 A | 5/2000 | Baumoel | |
| 6,816,808 B2 | 11/2004 | Freund, Jr. et al. | |
| 6,950,768 B2 | 9/2005 | Freund, Jr. et al. | |
| 7,152,490 B1 | 12/2006 | Freund, Jr. et al. | |
| 7,373,808 B2 * | 5/2008 | Zanker et al. | 73/105 |
| 2005/0055171 A1 * | 3/2005 | Freund et al. | 702/89 |

OTHER PUBLICATIONS

PCT International Search Report and Written Opinion for International Application No. PCT/US2009/034879 filed Feb. 23, 2009.

* cited by examiner

*Primary Examiner* — Aditya Bhat
(74) *Attorney, Agent, or Firm* — Mark E. Scott; Conley Rose, P.C.

(57) ABSTRACT

Determining a pattern of arrival time cycle skip in an acoustic flow meter. At least some of the illustrative embodiments are methods comprising transceiving acoustic signals through a fluid flowing in a meter (the transceiving between respective pairs of a plurality of transducer pairs), measuring transit time of acoustic signals between the respective pairs of the plurality of transducers pairs, calculating a plurality of error values (each error value indicative of a cycle skip mode in measuring of the transit time of the acoustic signals), and determining the cycle skip mode using, at least in part, the plurality of error values.

23 Claims, 5 Drawing Sheets

METHOD AND SYSTEM OF DETERMINING A PATTERN OF ARRIVAL TIME CYCLE SKIP IN AN ACOUSTIC FLOW METER

CROSS REFERENCE TO RELATED APPLICATIONS

None.

BACKGROUND

After hydrocarbons have been removed from the ground, the fluid stream (such as crude or natural gas) is transported from place-to-place via pipelines. It is desirable to know with accuracy the amount of fluid flowing in the stream, and particular accuracy is demanded when the fluid is changing hands, or "custody transfer." Ultrasonic flow meters may be used to measure the amount of fluid flowing in a pipeline, and ultrasonic flow meters have sufficient accuracy to be used in custody transfer.

In an ultrasonic flow meter, ultrasonic signals are sent back and forth across the fluid stream to be measured. One of the parameters sensed in determining fluid flow is arrival time of an ultrasonic signal at a transducer. However, because of noise in the fluid system, and inherent shortcomings in the electronic systems of the ultrasonic meter, it is difficult in some situations for the electronics of the meter to consistently select the same feature of a detected acoustic signal to signify arrival time. More particularly, in some situations the selected feature of the detected ultrasonic signal used to signify the arrival time may be off by one or more cycles of the ultrasonic signal from the desired feature. Where the feature selected by the electronics to signify arrival of the ultrasonic signal is different than the desired feature, "cycle skip" is said to have occurred.

The situation is further complicated by the fact that many ultrasonic meters have multiple transducer pairs, each transducer pair sending and receiving ultrasonic signals. The feature of the detected ultrasonic signal for a first transducer pair may be off a cycle or more before the desired feature, and the feature of a second transducer pair may be off a cycle or more after the desired feature. In fact, in an ultrasonic meter having four transducer pairs, and considering only correctly identifying the desired feature, cycle skip of one cycle before the desired feature, and cycle skip of one cycle after the desired feature (three possibilities), there are $3^4$ or 81 different cycle skip configurations that could occur. Given the number of possible cycle skip configurations, identifying the cycle skip configuration may be difficult, particularly where the processing power of the electronics is limited.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, meter manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The various embodiments were developed in the context of a four path or four "chord" ultrasonic flow meter, and the description is based on the developmental context. However, the systems and methods described may be used for, and within, any multi-path acoustic-type flow meter, and thus the developmental context and description should not be construed to limit the breadth to just four chord ultrasonic flow meters.

Figure 1A:
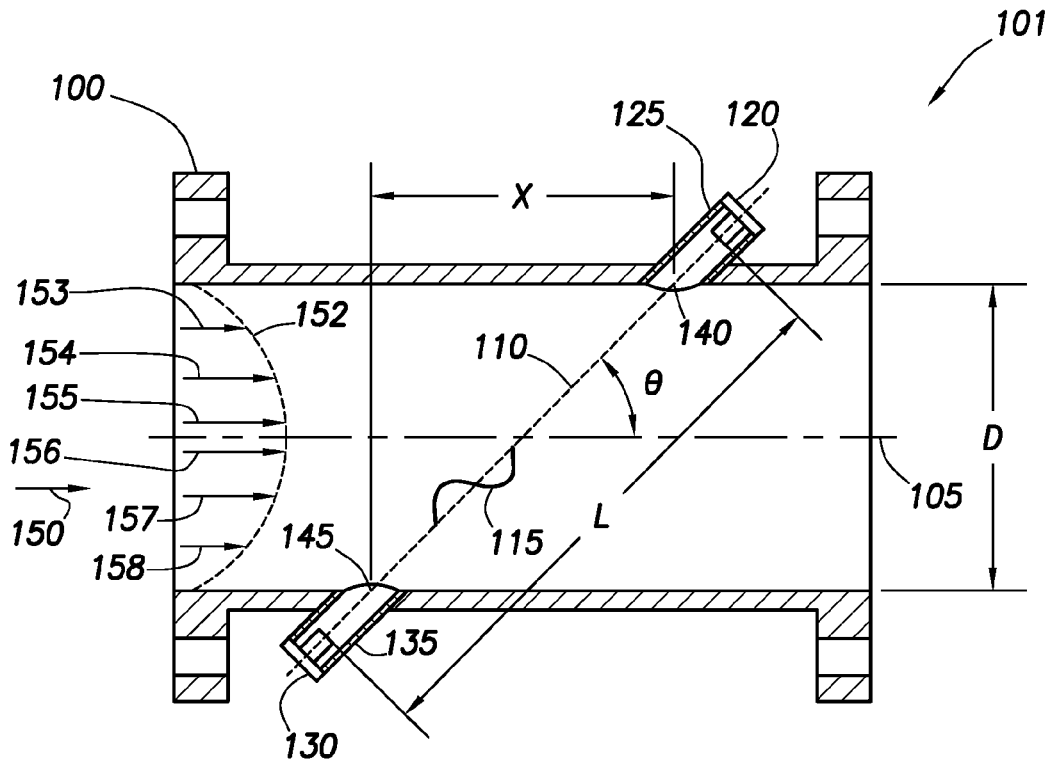
FIG. 1A shows a cross-section elevation view of a flow meter in accordance with at least some embodiments.

FIG. 1A shows an ultrasonic flow meter 101 in order to explain the various components and relationships of an ultrasonic flow meter. Spool piece 100, suitable for placement between sections of a pipeline, has a predetermined size and defines a central passage through which a measured fluid flows. An illustrative pair of transducers 120 and 130, and their respective housings 125 and 135, are located along the length of spool piece 100. Transducers 120 and 130 are acoustic transceivers, and more particularly ultrasonic transceivers, meaning that they both generate and receive acoustic signals having frequencies of above about 20 kilohertz. The acoustic signals may be generated and received by a piezoelectric element in each transducer. To generate an ultrasonic signal, the piezoelectric element is stimulated electrically by way of a sinusoidal signal, and it responds by vibrating. The vibration of the piezoelectric element generates the acoustic signal that travels through the measured fluid to the corresponding transducer of the transducer pair. Similarly, upon being struck by an acoustic signal, the receiving piezoelectric element vibrates and generates a sinusoidal electrical signal that is detected, digitized, and analyzed by electronics associated with the meter.

A path 110, sometimes referred to as a "chord," exists between illustrative transducers 120 and 130 at an angle θ to a centerline 105. The length of "chord" 110 is the distance between the face of transducer 120 and the face of transducer 130. Points 140 and 145 define the locations where acoustic signals generated by transducers 120 and 130 enter and leave fluid flowing through the spool piece 100 (i.e., the entrance to the spool piece bore). The position of transducers 120 and 130 may be defined by the angle θ, by a first length L measured between transducers 120 and 130, a second length X corresponding to the axial distance between points 140 and 145, and a third length "d" corresponding to the pipe inside diameter. In most cases distances d, X and L are precisely determined during meter fabrication. Further, transducers such as 120 and 130 are usually placed a specific distance from points 140 and 145, respectively, regardless of meter size (i.e., spool piece size). A fluid, such as natural gas, flows in a direction 150 with a velocity profile 152. Velocity vectors 153-158 illustrate that the gas velocity through spool piece 100 increases toward the centerline 105 of the spool piece 100.

Initially, downstream transducer 120 generates an ultrasonic signal that is incident upon, and thus detected by, upstream transducer 130. Some time later, the upstream transducer 130 generates a return ultrasonic signal that is subsequently incident upon, and detected by, the downstream transducer 120. Thus, the transducers 120 and 130 play "pitch and catch" with ultrasonic signals 115 along chordal path 110. During operation, this sequence may occur thousands of times per minute.

The transit time of the ultrasonic signal 115 between transducers 120 and 130 depends in part upon whether the ultrasonic signal 115 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the meter carrying the fluid, the average velocity over the area of the meter bore may be used to find the volume of fluid flowing through the spool piece 100.

Figure 1B:
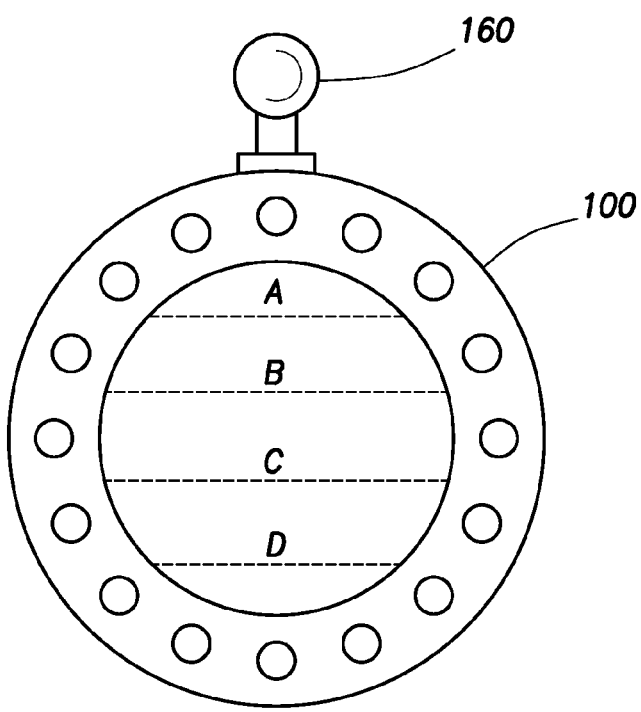
FIG. 1B shows an elevation end-view of a flow meter in accordance with at least some embodiments.

Ultrasonic flow meters can have one or more acoustic signal paths. FIG. 1B illustrates an elevation view of one end a multi-path ultrasonic flow meter. The ultrasonic flow meter of FIG. 1B comprises four chordal paths A, B, C and D at varying levels within the spool piece 100. Each chordal path A-D corresponds to a transducer pair behaving alternately as a transmitter and receiver. Also shown is control electronics enclosure 160, which control electronics acquire and process the data from the four chordal paths A-D. Hidden from view in FIG. 1B are the four pairs of transducers that correspond to chordal paths A-D.

Figure 1C:
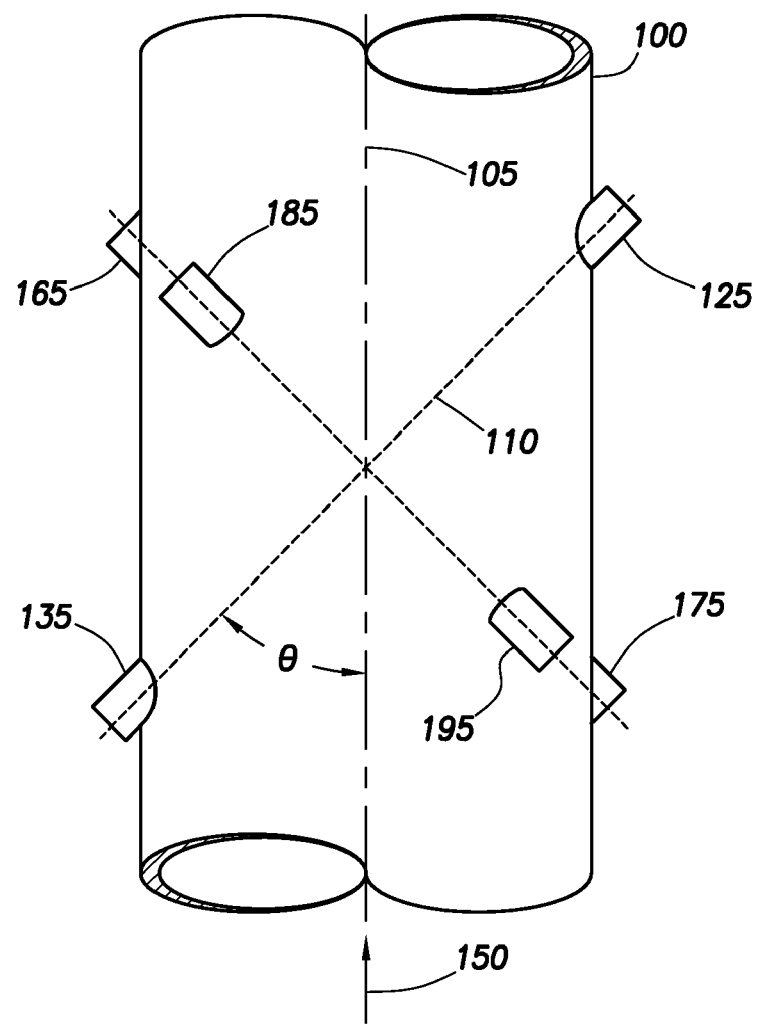
FIG. 1C shows an overhead view of a flow meter in accordance with at least some embodiments.

The arrangement of the four pairs of transducers may be more easily understood by reference to FIG. 1C. Four pairs of transducer ports are mounted on spool piece 100. Each pair of transducer ports corresponds to a single chordal path of FIG. 1B. A first pair of transducer ports 125 and 135 comprises transducers 120 and 130 (FIG. 1A) recessed slightly from the spool piece 100. The transducers are mounted at a non-perpendicular angle θ to centerline 105 of spool piece 100. Another pair of transducer ports 165 and 175 (only partially in view) and associated transducers is mounted so that its chordal path loosely forms the shape of an "X" with respect to the chordal path of transducer ports 125 and 135. Similarly, transducer ports 185 and 195 are placed parallel to transducer ports 165 and 175 but at a different "level" (i.e., a different radial position in the pipe or meter spool piece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities are combined to determine an average flow velocity over the entire pipe. From the average flow velocity, the amount of fluid flowing in the spool piece, and thus the pipeline, may be determined.

Figure 2:
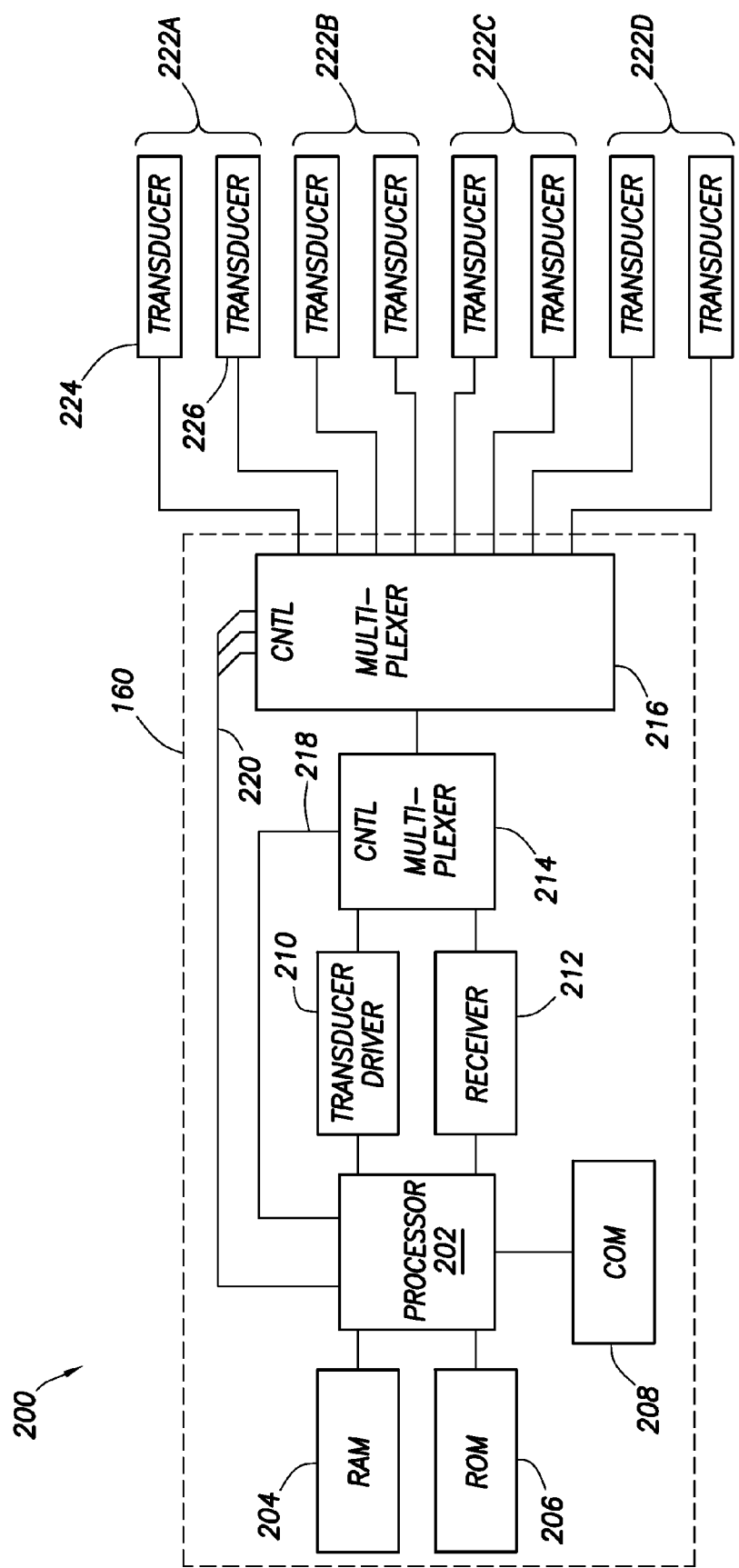
FIG. 2 shows electronics of a flow meter in accordance with at least some embodiments.

FIG. 2 illustrates control electronics 200 of an ultrasonic flow meter in accordance with at least some embodiments. The control electronics 200 may reside with the electronics enclosure 160 of FIG. 1B, which electronics enclosure 160 may couple to the spool piece. Alternatively, the electronics enclosure 160 may be equivalently mounted proximate (i.e., within a few feet) of the spool piece. The control electronics 200 comprise a processor 202 coupled to a random access memory (RAM) 204, read only memory (ROM) 206 and communication port (COM) 208. The processor 202 is the device within which programs execute to perform the tasks of the various embodiments. The ROM 206 is a non-volatile memory which stores operating system programs, as well as programs to implement the various embodiments. The RAM 204 is the working memory for the processor 202, and before execution some programs and/or data structures may be copied from the ROM 206 to the RAM 204. In alternative embodiments, some programs and data structures may be access directly from the ROM 206. The communication port 208 is the mechanism by which the meter communicates with upstream devices, such as flow computers (which may accumulate measured fluid flow from a plurality of fluid meters) and/or a data acquisition system. While the processor 202, RAM 204, ROM 206 and communication port 208 are illustrated as individual devices, in alternative embodiments microcontrollers are used, which microcontrollers integrally comprise a processing core, RAM, ROM and communication ports.

Processor 202 further couples to and controls a plurality of devices in order to send and receive acoustic signals through the measured fluid. In particular, the processor 202 couples to a transducer driver 210, receiver 212, and two multiplexers 214 and 216 by way of control lines 218 and 220, respectively. In some embodiments, the transducer driver 210 comprises an oscillator circuit and an amplifier circuit. The transducer drive 210 in these embodiments creates an initial signal, amplifies the signal to sufficient signal strength to drive a transducer, and provides impedance matching with respect to the transducers. In other embodiments, the transducer driver receives an alternating current (AC) signal of the desired frequency from the processor 202, amplifies the signal and provides impedance matching with respect to the transducers. The receiver 212 likewise may take many forms. In some embodiments, the receiver 212 is an analog-to-digital converter which takes the analog waveform created by a transducer representative of the received acoustic signal, and converts the signal to digital form. In some cases, the receiver 212 may filter and/or amplify the signals prior to or after digitization. The digitized version of the received signal may then pass to the processor 202 for detection of the desired feature (discussed more below). In yet still other embodiments, the receiver 212 may have the ability to perform some or all of the detecting of the desired feature.

The processor 202, executing a program, selectively controls the multiplexers 214 and 216 to couple each transducer of each transducer pair 222 to the transducer driver 210 (to drive the transducer to create the acoustic signal) and to the receiver 212 (to receive the electrical signal created by the transducer in response to the acoustic signal). In some embodiments, the processor 202, within the span of a one second measurement period, directs each transducer pair to send approximately 30 upstream acoustic signals and 30 downstream acoustic signals. Greater or fewer sets of upstream and downstream acoustic signals for each transducer pair, and longer or shorter measurement periods, may be equivalently used.

Still referring to FIG. 2, and focusing particularly on transducer pair 222A as representative of all the transducer pairs 222. For purposes of this discussion, transducer 224 is the sending transducer, and transducer 226 is the receiving transducer; however, in actual operation these roles change alternately. Under control of the processor 202, the transducer driver 210 is coupled, through multiplexers 214 and 216, to the transducer 224. An electrical signal generated and/or amplified by the transducer driver 210 propagates to and excites a piezoelectric element in transducer 224, and in turn transducer 224 generates an acoustic signal. The acoustic signal traverses the distance between transducer 224 and transducer 226 in the measured fluid. For convenience of the drawing, the transducer pair 222A of FIG. 2 is not aligned, but in operation the transducer pair would be substantially coaxial, as illustrated in FIG. 1A. During the flight time of the acoustic signal between transducer 224 and transducer 226, the processor 202 changes the configuration of the multiplexers 214 and 216 to couple transducer 226 to the receiver 212. Transducer 226 receives the acoustic signal, and an electrical signal corresponding to the received acoustic signal propagates to the receiver 212. Processor 202 notes the time when the transducer driver 210 is commanded to generate the driving signal, and the processor 202, analyzing the signal received by the receiver 212, notes the time that a selected feature of the received signal is present.

The total time measured by the processor 202 comprises not only the transit time of the acoustic signal through the fluid between representative transducer 224 and 226, but also propagation delays of electrical signals within the control electronics 200 and related cabling (e.g., signal propagation delay through multiplexers 214 and 216, and signal propagation delay through the cables coupled between the multiplexer 216 and the transducers). For purposes of the various embodiments, the propagation delays are either known or knowable, and thus are taken into account in determining an actual transit time. Of interest to the various embodiments is selecting a feature of the received signal to designate as the arrival time of the acoustic signal.

Figure 3:
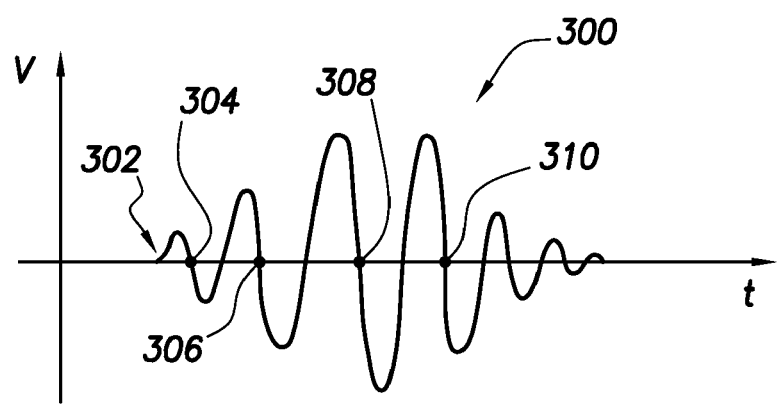
FIG. 3 shows an illustrative received signal in accordance with at least some embodiments.

FIG. 3 illustrates a received signal 300 as a function of time in order to discuss selection of a particular feature of a received signal to designate as the arrival time. In particular, the received signal 300 comprises a first movement 302, followed by four negative-going zero crossings 304, 306, 308 and 310. In accordance with at least some embodiments, the desired feature to select to identify the arrival time of the acoustic signal is the second negative-going zero crossing 306. However, the illustration of FIG. 3 is idealized. In practice, the presence of acoustic noise in the measured fluid and imperfections in a transducer's ability to create acoustic energy from electrical energy (and vice versa), make identifying a particular zero crossing difficult. Thus, in some circumstances the processor 202 may misidentify a zero crossing as the desired feature. Misidentifying a non-desired zero crossing as the desired zero crossing will be referred to as "cycle skip". For example, because of noise and/or other difficulties the processor 202 may misidentify zero crossing 304 as the desired feature. For purposes of this disclosure, selecting a zero crossing that occurs prior in time than the desired feature will be referred to as negative cycle skip. As yet another example, because of noise and/or other difficulties the processor 202 may misidentify zero crossing 308 or zero crossing 310 as the desired feature. For purposes of this disclosure, selecting a zero crossing that occurs later in time than the desired feature will be referred to as positive cycle skip.

As mentioned above, one parameter of interest in calculating fluid flow through an ultrasonic meter is the transit time of an acoustic signal between transducers of a transducer pair. The feature selected as an indication of the arrival time of acoustic energy is important in determining the transit time. For example, and still referring to FIG. 3, if negative cycle skip occurs (e.g., zero crossing 304 is selected rather than zero crossing 306), then the transit time will be shorter by the period (the time to complete one cycle) of the acoustic signal than the actual transit time. Likewise, if a positive one cycle skip occurs (e.g., zero crossing 308 is selected), then the transit time will be longer by the period of the acoustic signal than the actual transit time. For an illustrative set of transducers operating at 125 kilo-Hertz (kHz), one period of the acoustic signal is approximately 8 micro-seconds (µs). Thus, a negative one cycle skip shortens the transit time by approximately 8 µs, and a positive one cycle skip lengthens the transit time by approximately 8 µs. While the differences are small, such differences adversely affect measured transit time.

In order to check for the presence of cycle skip, a function, termed the Eta ($\eta$) function, has been developed that compares measured speeds of sound (directly related to measured transit time) with respect to two chords of different length and provides a value that is indicative of cycle skip. In particular, the Eta function takes the form:

$$\eta_{BA} = \frac{L_B L_A}{L_B - L_A} \cdot \frac{c_B - c_A}{c_A c_B} \quad (1)$$

where $L_A$ and $L_B$ are the lengths of chords B and A respectively, and $c_B$ and $c_A$ are the measured speeds of sound for chords B and A respectively. Similar Eta functions can be defined for chords B and D, chords C and A, and chords C and D. If no cycle skip has occurred, the speed of sound for each chord should be the same, and in the idealized case the value of the Eta function is zero. In practice, acoustic noise, electrical noise and other shortcomings may force Eta to be non-zero but nevertheless small in the absence of cycle skip. On the other hand, if either chord used in the comparison has experienced cycle skip, the speed of sound for that chord will likewise change, and Eta takes on a relatively large non-zero value (in comparison to the value of Eta with no cycle skip). Thus, a large Eta value is indicative of a cycle skip on at least one of the two chords for which the Eta was calculated, and the magnitude and sign are indicative of whether the cycle skip was negative or positive. Eta is a single value, but is based on information regarding two chords. If Eta indicates cycle skip, determining whether one or both chords experienced cycle skip, and whether each cycle skip was positive or negative for each chord, is difficult. The problem is further exacerbated in the illustrative four chord meter.

The pattern of the cycle skip across all the chords of a meter is referred to for purposes of this disclosure and claims as the pattern or configuration of arrival time cycle skip, or the cycle skip mode. The pattern of arrival time cycle skip includes the case where no cycle skip occurs on any chord. The number of possible patterns of arrival time cycle skip is equal to the number possible features to select as the arrival time raised to the power of the number of chords. For example, considering only correctly identifying the desired feature, cycle skip of one cycle before the desired feature, and cycle skip of one cycle after the desired feature (three possibilities) and a four chord meter, there are $3^4$ or 81 different patterns of arrival time cycle skip that can occur. If it is further considered that a cycle skip of two cycles after the desired feature is possible, for a four chord meter, there are $4^4$ or 256 difference patterns of arrival time cycle skip While a single Eta computation to determine the mere presence or absence of cycle skip among two chords is relatively straight forward, given that each Eta does not identify which chord experienced the cycle skip, multiple Eta calculations are needed to determine a pattern of arrival time cycle skip across all the chords. The computational time to calculate Etas for all possible patterns of arrival time cycle skip may be too much for the limited processor capability in an ultrasonic flow meter. Moreover, non-zero Eta values caused by noise even in the absence of cycle skip dictate establishing thresholds against which the Eta values are tested to ascertain the presence or absence of cycle skip, and such thresholds are subject to error. In order to address the noted shortcomings in determining the pattern of arrival time cycle skip, the various embodiments calculate a plurality of error functions, each error function indicative of a particular pattern of arrival time cycle skip. By evaluating the values of the error functions, the pattern of arrival time cycle skip may be determined. The specification now turns to derivation of an error function usable in at least some embodiments.

The derivation of the illustrative error function is based on how cycle skip errors affect speed of sound calculations. In particular, the speed of sound measured along a particular chord of an ultrasonic flow meter takes the form:

$$c = \frac{L}{2}\frac{T_{Up} + T_{Dn}}{T_{Up}T_{Dn}} \quad (2)$$

where c is the speed of sound, L is length of a chord, $T_{up}$ is the upstream transit time and $T_{DN}$ is the downstream transit time. Errors in the measured speed of sound caused by errors in the transit time are given by:

$$\Delta c = \frac{\partial c}{\partial T_{Up}}\Delta T_{Up} + \frac{\partial c}{\partial T_{Dn}}\Delta T_{Dn} = -\frac{L}{2}\left(\frac{\Delta T_{Up}}{T_{Up}^2} + \frac{\Delta T_{Dn}}{T_{Dn}^2}\right) \quad (3)$$

where $\Delta c$ is the error in the measured speed of sound, and $\Delta T_{Up}$ and $\Delta T_{Dn}$ are the errors in the upstream and downstream transit times, respectively. Compared to transit time errors caused by cycle skip, the difference between upstream and downstream transit time is relatively small. Thus, the upstream transit time and downstream transit times may be approximated as $T_{Up} \cong T_{Dn} \cong L/c$ for the purpose of computing errors in the speed of sound caused by cycle skip. Using the approximation that the upstream and downstream transit times are approximately equal, Equation 3 simplifies to:

$$\Delta c \cong -\frac{c^2}{L}\frac{\Delta T_{Up} + \Delta T_{Dn}}{2} = -\frac{c^2}{L}\varepsilon \quad (4)$$

where $\varepsilon$ is the mean transit time error and is defined to be the average of the upstream and downstream transit times errors. The measured speed of sound $c_A$ for chord A can then be written as:

$$c_A = c + \Delta c_A = c - \frac{c^2}{L_A}\varepsilon_A \quad (5)$$

where $\varepsilon_A$ is the mean transit time error for chord A. Similar expressions exist for chords B, C, and D. Using equation (5) for the speed of sound for each of the illustrative four chords, equation (1) can be re-written as:

$$\eta_{BA} = \frac{L_B L_A}{L_B - L_A} \cdot \frac{\left(c - \frac{c^2}{L_B}\varepsilon_B\right) - \left(c - \frac{c^2}{L_A}\varepsilon_A\right)}{\left(c - \frac{c^2}{L_B}\varepsilon_B\right)\left(c - \frac{c^2}{L_A}\varepsilon_A\right)}. \quad (6)$$

Equation (6) can be simplified by algebraic manipulation of the numerator, and by approximating that right half of the denominator is equal to $c^2$ if the mean transit time errors are small. Using the algebraic manipulation and approximation, equation (6) may thus be written as:

$$\eta_{BA} = \frac{L_B L_A}{L_B - L_A} \cdot \frac{c^2\left(\frac{\varepsilon_A}{L_A} - \frac{\varepsilon_B}{L_B}\right)}{c^2} \quad (7)$$

From here, equation (7) can be further simplified to:

$$\eta_{BA} = \frac{L_B \varepsilon_A - L_A \varepsilon_B}{L_B - L_A}. \quad (8)$$

Equation 8 is referred to below as a theoretical Eta ($\eta^{Theory}$) as the equation may be utilized to give theoretical Eta values based on assumed mean transit time errors. Equation (8) is with respect to only chords A and B, and similar expressions exist for chords C and A, and chords C and D.

Transit time errors caused by cycle skip are directly related to the period (the time to complete one cycle) of the acoustic signals. Again, for an illustrative set of transducers operating at 125 kHz, one period of the acoustic signal is approximately 8 micro-seconds (ps). Thus, for the illustrative case of a 125 KHz acoustic signal, a negative one cycle skip creates a transit time error $\varepsilon$ of approximately −8 μs, and a positive one cycle skip creates a transit time error $\varepsilon$ of approximately 8 μs.

For a four chord meter, and considering the possible outcomes for a particular transit time measurement of one negative cycle skip, no cycle skip, and one positive cycle skip, again there are 81 possible configurations of the cycle skips across all four chords. So as not to unduly complicate the description, Table 1 below illustrates a subset of the possible patterns of arrival time cycle skip in the section titled "Cycle skip", and in the "Mean transit time error" section the mean transit time errors for the subset are presented assuming a 125 kHz acoustic signal and thus a period of 8 μs.

TABLE 1

| Cycle skip | | | | | | | | Mean transit time error | | | |
|---|---|---|---|---|---|---|---|---|---|---|---|
| AUp | ADn | BUp | BDn | CUp | CDn | DUp | DDn | $\epsilon_A$ (μs) | $\epsilon_B$ (μs) | $\epsilon_C$ (μs) | $\epsilon_D$ (μs) |
| 0 | 0 | 0 | 0 | 0 | 0 | 0 | 0 | 0 | 0 | 0 | 0 |
| 1 | 1 | 0 | 0 | 0 | 0 | 0 | 0 | 8 | 0 | 0 | 0 |
| −1 | −1 | 0 | 0 | 0 | 0 | 0 | 0 | −8 | 0 | 0 | 0 |
| 0 | 0 | 1 | 1 | 0 | 0 | 0 | 0 | 0 | 8 | 0 | 0 |
| 0 | 0 | −1 | −1 | 0 | 0 | 0 | 0 | 0 | −8 | 0 | 0 |
| 1 | 1 | 1 | 1 | 0 | 0 | 0 | 0 | 8 | 8 | 0 | 0 |
| −1 | −1 | −1 | −1 | 0 | 0 | 0 | 0 | −8 | −8 | 0 | 0 |
| 0 | 0 | 1 | 1 | −1 | −1 | 0 | 0 | 0 | 8 | −8 | 0 |
| 1 | 1 | 1 | 1 | 1 | 1 | 1 | 1 | 8 | 8 | 8 | 8 |
| −1 | −1 | −1 | −1 | −1 | −1 | −1 | −1 | −8 | −8 | −8 | −8 |
| 1 | 0 | 0 | 0 | 0 | 0 | 0 | 0 | 4 | 0 | 0 | 0 |
| −1 | 0 | 0 | 0 | 0 | 0 | 0 | 0 | −4 | 0 | 0 | 0 |
| 0 | 1 | 0 | 0 | 0 | 0 | 0 | 0 | 4 | 0 | 0 | 0 |
| 0 | −1 | 0 | 0 | 0 | 0 | 0 | 0 | −4 | 0 | 0 | 0 |
| 2 | 2 | 0 | 0 | 0 | 0 | 0 | 0 | 16 | 0 | 0 | 0 |
| 0 | 0 | 2 | 2 | 0 | 0 | 0 | 0 | 0 | 16 | 0 | 0 |

In particular, in the "Cycle skip" section, −1 indicates one negative cycle skip, 0 indicates no cycle skip, 1 indicates one positive cycle skip, and 2 indicates two positive cycle skips. The section titled "Mean transit time error" indicates the mean transit time error $\epsilon$ for the corresponding pattern or arrival time cycle skip.

Consider, as an example, the second row of the table. The series of numbers {1 1 0 0 0 0 0 0} signify a possible pattern of arrival time cycle skip across the four chords (considering both upstream and downstream acoustic signals) where both the upstream and downstream transit times for chord A are off by the period of one positive cycle skip (i.e., the measured transit times are greater than the actual transit times by at least 8 μs), and the remaining upstream and downstream chords experience no cycle skip. As discussed above, $\epsilon$ defined to be the average of the upstream and downstream transit time error. For the illustrative second row of Table 1, the average of the upstream error of 8 μs and the downstream error of 8 μs is thus 8 μs, and so EA is 8 μs and the remaining mean transit time errors are zero. Stated again, every row in the Cycle skip section of the table is representative of a possible pattern of arrival time cycle skip across the illustrative four chords of a meter, but Table 1 is not exhaustive.

Using the assumed mean transit time errors of Table 1 for each of the possible patterns or arrival time cycle skip of Table 1, a series of theoretical Eta values may be calculated using equation (8) above. The Eta values calculated using the mean transit time errors of Table 1 are theoretical in the sense that the mean transit time errors of Table 1 represent what the mean transit time errors should be if the meter experiences a pattern of arrival time cycle skip to which the mean transit time errors correlate. Table 2 below comprises the Cycle skip and Mean transit time error of Table 1, and also includes the theoretical Eta values calculated using equation (8), the mean transit time errors from table, and assuming chord lengths to be $L_B \cong L_C \cong 1.6 L_A \cong 1.6 L_D$.

TABLE 2

| Cycle skip | | | | | | | | Mean transit time error | | | | Theoretical Eta | | | |
|---|---|---|---|---|---|---|---|---|---|---|---|---|---|---|---|
| AUp | ADn | BUp | BDn | Cup | CDn | DUp | DDn | $\epsilon_A$ (μs) | $\epsilon_B$ (μs) | $\epsilon_C$ (μs) | $\epsilon_D$ (μs) | $\eta_{BA}$ (μs) | $\eta_{BD}$ (μs) | $\eta_{CA}$ (μs) | $\eta_{CD}$ (μs) |
| 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 8 | 0 | 0 | 0 | 21 | 0 | 21 | 0 |
| −1 | −1 | 0 | 0 | 0 | 0 | 0 | 0 | −8 | 0 | 0 | 0 | −21 | 0 | −21 | 0 |
| 0 | 0 | 1 | 1 | 0 | 0 | 0 | 0 | 0 | 8 | 0 | 0 | −13 | −13 | 0 | 0 |
| 0 | 0 | −1 | −1 | 0 | 0 | 0 | 0 | 0 | −8 | 0 | 0 | 13 | 13 | 0 | 0 |
| 1 | 1 | 1 | 1 | 0 | 0 | 0 | 0 | 8 | 8 | 0 | 0 | 8 | −13 | 21 | 0 |
| −1 | −1 | −1 | −1 | 0 | 0 | 0 | 0 | −8 | −8 | 0 | 0 | −8 | 13 | −21 | 0 |
| 0 | 0 | 1 | 1 | −1 | −1 | 0 | 0 | 0 | 8 | −8 | 0 | −13 | −13 | 13 | 13 |
| 1 | 1 | 1 | 1 | 1 | 1 | 1 | 1 | 8 | 8 | 8 | 8 | 8 | 8 | 8 | 8 |
| −1 | −1 | −1 | −1 | −1 | −1 | −1 | −1 | −8 | −8 | −8 | −8 | −8 | −8 | −8 | −8 |
| 1 | 0 | 0 | 0 | 0 | 0 | 0 | 0 | 4 | 0 | 0 | 0 | 10 | 0 | 10 | 0 |
| −1 | 0 | 0 | 0 | 0 | 0 | 0 | 0 | −4 | 0 | 0 | 0 | −10 | 0 | −10 | 0 |
| 0 | 1 | 0 | 0 | 0 | 0 | 0 | 0 | 4 | 0 | 0 | 0 | 10 | 0 | +10 | 0 |
| 0 | −1 | 0 | 0 | 0 | 0 | 0 | 0 | −4 | 0 | 0 | 0 | −10 | 0 | −10 | 0 |
| 2 | 2 | 0 | 0 | 0 | 0 | 0 | 0 | 16 | 0 | 0 | 0 | 42 | 0 | 42 | 0 |
| 0 | 0 | 2 | 2 | 0 | 0 | 0 | 0 | 0 | 16 | 0 | 0 | −26 | −26 | 0 | 0 |

For the representative second row having a pattern of arrival time cycle skip being {1 1 0 0 0 0 0 0}, the theoretical Eta values are calculated using equation (8) are {21 0 21 0}.

In accordance with the various embodiments, for each possible pattern of arrival time cycle skip, an error function or error value is calculated using the theoretical Eta values for the pattern of arrival time cycle skip, and actual Eta values from the meter. In accordance with some embodiments, the error function takes form:

$$E(\varepsilon, c) = \sum_i \left| \eta_i^{Theory}(\varepsilon) - \eta_i^{Meas}(c) \right| \quad (9)$$

where $E(\varepsilon, c)$ is the error as a function of the mean transit time error $\varepsilon$ and the measured speed of sound c, $\eta^{Theory}$ is the theoretical Eta values calculated using equation (8) above, $\eta^{Meas}$ is the actual Eta values calculated using equation (1) above, and i is the chord pairs (e.g., for a four chord meter, chord pairs BA, BD, CA and CD).

When the actual pattern of arrival time cycle skip matches a possible pattern of arrival time cycle skip from the table, in the ideal case the value of the error function is zero. In practice, acoustic noise, electrical noise and other shortcomings may force the measured Eta to be non-zero but nevertheless small in the absence of cycle skip, and likewise the error function may have a small value if the actual pattern of arrival time cycle skip matches a possible pattern of arrival time cycle skip. On the other hand, if the actual pattern of arrival time cycle skip is different than the possible pattern of arrival time cycle skip, the error function takes on a relatively large non-zero value (in comparison to the value of a match). Thus, for each possible pattern of arrival time cycle skip, the error function is calculated. Once an error function for each possible pattern of arrival time cycle skip is calculated, and inasmuch as only one possible pattern of arrival time cycle skip (including the no cycle skip case) will match an actual pattern of arrival time cycle skip, the actual pattern of arrival time cycle skip is identified by finding the error function that has the minimum value. Stated otherwise, the actual pattern of arrival time cycle skip is identified without the need of comparing the error functions to thresholds subject to errors; rather, one need only identify the error function with the minimum value which corresponds to a possible pattern of arrival time cycle skip and thus identifies the actual pattern of arrival time cycle skip.

A few points before discussion of how determining the actual pattern of arrival time cycle skip may be used. First, the possible pattern of arrival time cycle skip may be established at the time of meter design and placed in a data table in a memory in the ultrasonic flow meter. It follows that there is little processor overhead associated with the possible pattern of arrival time cycle skip, and in fact the processor overhead may only be copying the table from a ROM device to a RAM device. Likewise, the theoretical Eta values are based on chord lengths and frequency of the acoustic signals to be used in the meter, both of which are established at the time of meter design. Thus, the theoretical Etas may be calculated in advance and placed in a data table in a memory in the ultrasonic flow meter. It follows that there is little processor overhead associated with the theoretical Eta values, and in fact the processor overhead may only be copying the theoretical Eta values from the ROM device to the RAM device for use. Even if in a particular ultrasonic flow meter the theoretical Etas are calculated with a more precise equation (e.g., equation (6) which is based on the speed of sound of the fluid in the meter), the theoretical Eta values can be calculated one time, possible during system boot, and placed in the table, thus representing little processor overhead during actual metering operations. For a four chord meter, calculating each error function involves only calculating four actual Eta values, and summing the four calculated actual Eta values with theoretical Eta values which theoretical Eta values are either provided, or only calculated one time by the processor.

Next, while it is possible to calculate the error function for each set of transit time measurements (i.e., one upstream and one downstream measurement for each chord), in accordance with other embodiments the upstream and downstream transit time measurements for each chord are averaged over a measurement period. For example, in an illustrative measurement period of one second, the ultrasonic flow meter may send 30 upstream and 30 downstream acoustic signals for each transducer pair, with the upstream and downstream transit time for each chord being the average of the transit time of the 30 acoustic signals. In such embodiments, the error function may be calculated based on the averaged upstream and downstream transit times. Thus, calculating the error functions may be performed by the ultrasonic flow meter only once per measurement period. Turning now to use of the information regarding the actual pattern of arrival time cycle skip.

Use of the information regarding the actual pattern of arrival time cycle skip may take many forms. In some cases, if the actual pattern of arrival time cycle skip is other than the situation where no cycle skip occurred, the user is notified of cycle skips (e.g., by way of an audible, visible or electronic based indication). In other embodiments, once an actual pattern of arrival time cycle skip is established (again other than no cycle skip), the processor 202, executing a program, corrects the transit time values experiencing the cycle skip, and likewise corrects the speed of sound measurement and flow measurements based thereon. Further still, cycle skips are in some cases a semi-permanent phenomenon, and thus a particular chord may experience cycle skip for an extended period of time. In such cases, the ultrasonic flow meter may determine an actual pattern of arrival time cycle skip in one measurement period, yet make corrections to transit time values in a subsequent measurement period. In fact, the error in the accumulated flow calculation (e.g., over days) caused by cycle skip in a single measurement period (e.g., one second), may be small, and thus the processor 202 may refrain from correcting transit time errors in the initial measurement period in favor correcting only future measurement periods.

Further still, in selecting a feature of the received signal, the processor 202 may utilize various arrival time detection parameters to better focus the search in the received signal. For example, the processor 202 may utilize adjustable amplification of the received signal (possibly in the receiver 212), an adjustable dead zone around the zero value of the received signal, and lockout times. Once an actual pattern of arrival time cycle skip is established (again other than no cycle skip), the processor 202 may make adjustments to the arrival time detection parameters in an attempt to eliminate cycle skip in future measurement periods. Again, because the error in the accumulated flow calculation (e.g., over days) caused by cycle skip in a single measurement period (e.g., one second), may be small, the processor 202 may refrain from correcting transit time errors in favor adjusting arrival time detection parameters. In yet other embodiments, the processor 202 may correct the transit times for the cycle skips, and also adjust the arrival time detection parameters.

Figure 4:
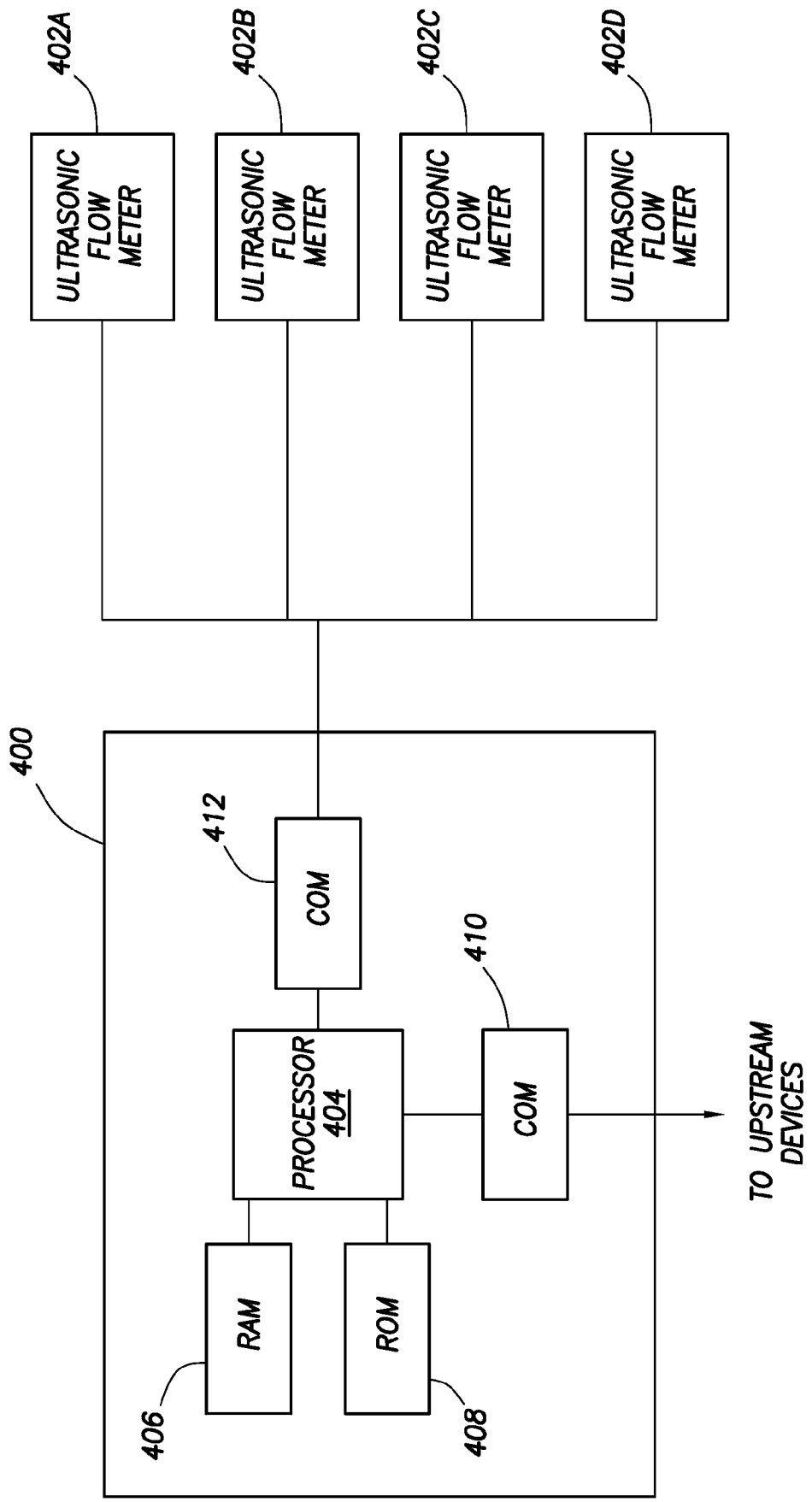
FIG. 4 shows a system comprising a flow computer in accordance with at least some embodiments.

The discussion of the specification to this point has assumed that determining the pattern of arrival time cycle skip takes place in the ultrasonic flow meter. However, in alternative embodiments the determination regarding the pattern of arrival time cycle skip may take place in upstream devices. FIG. 4 illustrates alternative embodiments where an upstream device makes the determination as to the actual pattern of arrival time cycle skip. In particular, FIG. 4 illustrates a flow computer 400 coupled to a plurality ultrasonic flow meters 402. The flow computer is configured to accumulate (i.e., maintain a running total) of fluid flow measured by each of the ultrasonic flow meters over a predetermined period of time. Each of the ultrasonic flow meters 402 may be constructed and operated substantially as described above. However, each meter 402 may be a different size (i.e., each spool pieces defines a central passage of a different size), or each meter may measure different types of fluids. For example, a natural gas meter run at a power plant may comprise a plurality of parallel and independent metering sections, each section optimized for particular range of natural gas flow rates. The flow computer 400 may thus accumulate fluid flows from each of the ultrasonic flow meters 402 to establish total natural gas flow into the power plant.

The illustrative flow computer 400 comprises processor 404 coupled to a RAM 406, ROM 408, communication port 410 and communication port 412. The processor 404 is the device within which programs execute to perform the tasks of accumulating flow volume, and also determining, and possible correcting, patterns of arrival time cycle skip. The ROM 408 is a non-volatile memory which stores operating system programs, as well as programs to implement the various embodiments. The RAM 406 is the working memory for the processor 404, and before execution some programs and/or data structures may be copied from the ROM 408 to the RAM 404. In alternative embodiments, some programs and data structures may be access directly from the ROM 408. The communication port 410 is the mechanism by which the flow computer 400 communicates with upstream devices, such as a data acquisition system. Likewise, communication port 412 is the mechanism by which the flow computer 400 communicates with the ultrasonic flow meters 402. In alternative embodiments, the flow computer may have an individual communication port 412 for each ultrasonic flow meter 402, and in yet still other embodiments as single communication port may serve to communicate both to the ultrasonic flow meters and the upstream devices. While the processor 404, RAM 406, ROM 408 and communication ports 410, 412 are illustrated as individual devices, in alternative embodiments microcontrollers are used, which microcontrollers integrally comprise a processing core, RAM, ROM and communication ports.

In accordance with these embodiments, at least one of the ultrasonic flow meters 402 is configured to send measured transit times for its chords to the flow computer 400. In some cases the measured transit times sent to the flow computer 400 are single upstream and downstream transit times for each chord, and in other cases the measured transit times sent to the flow computer 400 are average transit times over a measurement period. Correspondingly, the flow computer 400, and particularly the processor 404 and communication port 412, is configured to receive the measured transit times. In accordance the illustrated embodiments, the flow computer 400 is configured to determine the pattern of arrival time cycle skip in the manner described above in reference to the ultrasonic flow meter. Thus, if an ultrasonic meter has insufficient computing power to perform the calculations to determine the pattern of arrival time cycle skip, the computations may be performed by the flow computer to which the ultrasonic meter couples.

The actions performed in response to determining an actual pattern of arrival time cycle skip (other than no cycle skip) are similar to those performed by the ultrasonic flow meter. In some cases, the processor 404 of the flow computer 400, having copies of the transit time measurements, corrects the measurements based on the pattern of arrival time cycle skip. In other embodiments, the processor 404 corrects transit time measurements in subsequent measurement periods based on the actual pattern of arrival time cycle skip. Further still, the flow computer 400 may inform the ultrasonic flow meter 402 of the actual pattern of arrival time cycle skip, and force the ultrasonic meter to correct transit times (in the current or subsequent measurement periods) based on the pattern. Yet further still, alone or in combination with any of the above actions, the flow computer 400 may direct a change in the arrival time detection parameters of the ultrasonic flow meter 402.

Figure 5:
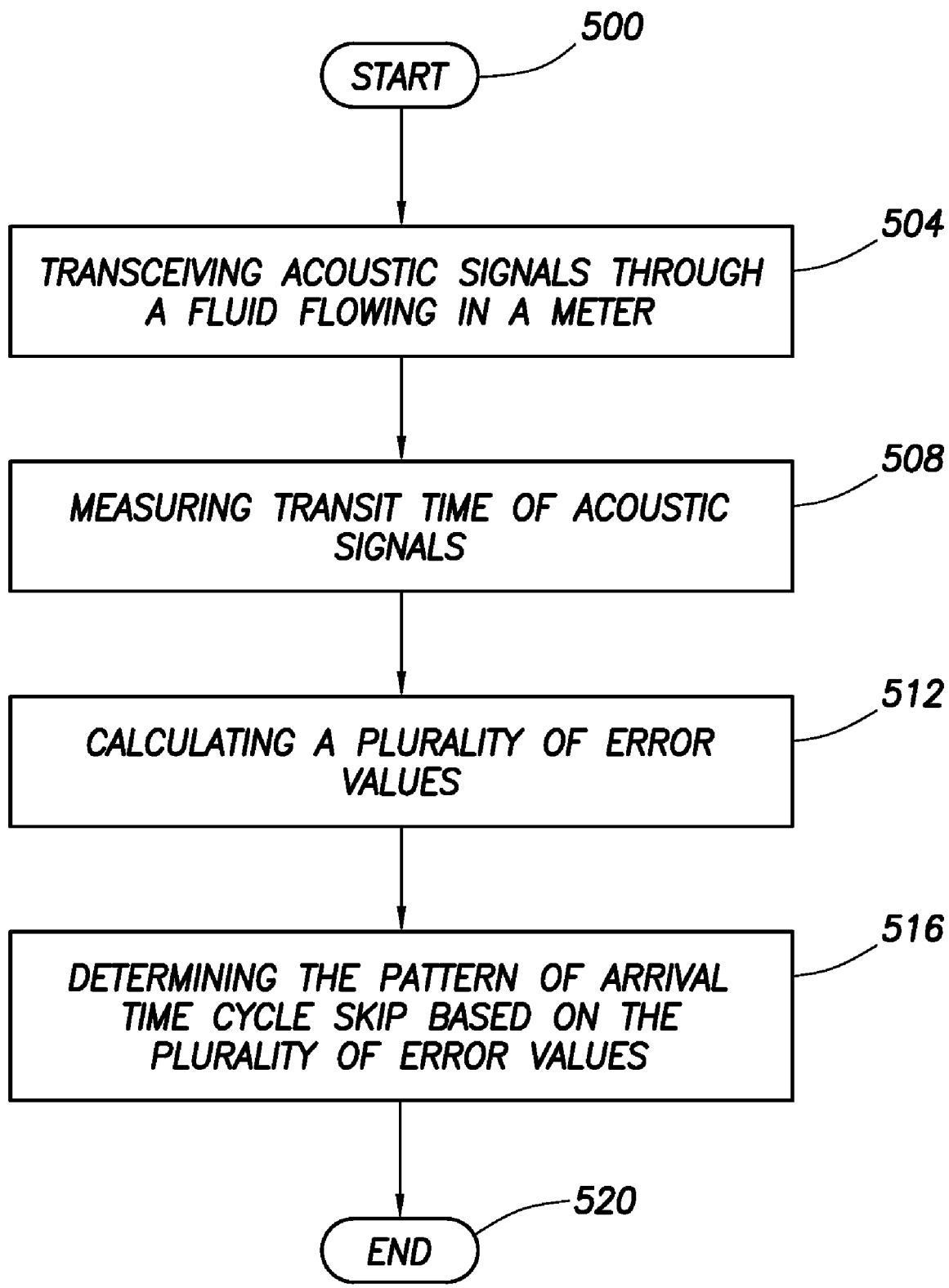
FIG. 5 shows a method in accordance with at least some embodiments.

FIG. 5 illustrates a method in accordance with at least some embodiments. In particular, the method starts (block 500), and proceeds to transceiving acoustic signals through a fluid flowing in a meter (block 504). In accordance with at least some embodiments, the transceiving is between respective pairs of a plurality of transducer pairs. Thereafter, the method proceeds to measuring transit time of acoustic signals (block 508). In embodiments using pairs of transducers, the measuring is between respective pairs of the transducers. Thereafter, the method proceeds to calculating a plurality of error values (block 512), where each error value is indicative of a pattern of arrival time cycle skip. In accordance with at least some embodiments, calculating the error values involves calculating theoretical Eta values as discussed above, and calculation error values using an equation such as equation (9) above. The method proceeds to determining the pattern of arrival time cycle skip based on the plurality of error values (block 516), and the method ends (block 520).

From the description provided herein, those skilled in the art are readily able to combine software created as described with appropriate general-purpose or special-purpose computer hardware to create a computer system and/or computer subcomponents in accordance with the various embodiments, to create a computer system and/or computer subcomponents for carrying out the methods of the various embodiments, and/or to create a computer-readable media for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, for physical reasons, it may be that certain patterns of arrival time cycle skip are more likely to occur than others, and thus the possible pattern of arrival time cycle skip held in the table need not include every possibility, but may comprise a subset of the most likely patterns of arrival time cycle skip. Moreover, equation (9) is designed to provide a small value when the actual and possible pattern of arrival time cycle skip match, but equivalent equations may produce large values when the actual and possible pattern of arrival time cycle skip match (e.g., $1/E(\epsilon, c)$), and in such cases searching through the values of the error function for maximum values may be equivalently implemented. It is intended that the following claims be interpreted to embrace all such variations and modifications.

What is claimed is:

1. A system comprising:
   a meter body defining a central passage, the meter body configured to couple to a pipe within which fluid flows;
   at least four transducer pairs coupled to the meter body, each transducer pair configured to propagate an acoustic signal across the central passage both in an upstream and a downstream direction;

a processor mechanically coupled to the meter body and electrically coupled to the at least four transducer pairs; and a memory electrically coupled to the processor, the memory stores a program executable by the processor;

said program causes the processor to determine transit time measurements of acoustic signals across the central passage in a first measurement period; and said program further causes the processor to determine a pattern of arrival time cycle skip of the transit time measurements across the at least four transducer pairs within the first measurement period.

2. The system of claim 1 further comprising:
said program causes the processor to calculate a plurality of values, each value indicative of a pattern of arrival time cycle skip across the at least four transducer pairs; and said program causes the processor to evaluate the plurality of values to determine the pattern of arrival time cycle skip.

3. The system of claim 2 wherein when the program evaluates the plurality of values, the program further causes the processor to select a particular value based on at least one selected from the group consisting of: a maxima of the plurality of values; and a minima of the plurality of values.

4. The system of claim 1 wherein the program further causes the processor to change an arrival time detection parameter for at least one transducer pair responsive to the pattern of arrival time cycle skip involving the at least one transducer pair.

5. The system of claim 4 wherein the program refrains from correcting transit time values responsive to the pattern of arrival time cycle skip.

6. The system of claim 1 wherein the program further causes the processor to correct transit time values of the first measurement period responsive to the pattern of arrival time cycle skip.

7. The system of claim 1 wherein the program further causes the processor to correct transit time values of a second measurement period responsive to the pattern of arrival time cycle skip.

8. The system of claim 7 wherein the program further causes the processor to correct transit time values of the second measurement period, the second measurement period immediately subsequent to the first measurement period.

9. A system comprising:
a processor;
a memory coupled to the processor, the memory stores a program executable by the processor;
a communication port coupled to the processor;
said program causes the processor to receive measured fluid flow values from a fluid meter, the receiving across the communication port, and maintain a running total of fluid flow through the fluid meter over a predetermined period of time; and
said program causes the processor to receive from the fluid meter acoustic signal transit time measurements for both upstream and downstream signals between each transducer pair of transducer pairs of the fluid meter, and the program causes the processor to determine a configuration of arrival time cycle skips in the transit time measurements.

10. The system of claim 9 further comprising the program changes an arrival time detection parameter in the fluid meter for at least one transducer pair responsive to the configuration of arrival time cycle skip.

11. The system of claim 10 further comprising the program refrains from correcting transit time values measurements.

12. The system of claim 9 further comprising the program corrects transit time measurements responsive to the configuration of arrival time cycle skips.

13. The system of claim 9 further comprising the program corrects transit time measurements from a second measurement period following a first measurement period, the corrections responsive to the configuration of arrival time cycle skips in the first measurement period.

14. The system of claim 9 further comprising:
when said program determines the configuration of arrival time cycle skips, the program calculates a plurality of values, each value indicative of a configuration of arrival time cycle skips; and
said program evaluates the plurality of values to determine the configuration of arrival time cycle skips.

15. A method comprising:
transceiving acoustic signals through a fluid flowing in a meter, the transceiving between respective pairs of four transducer pairs;
measuring transit time of acoustic signals between the respective pairs of the four transducer pairs;
calculating a plurality of error values, each error value indicative of a cycle skip mode in measuring of the transit time of the acoustic signals for all four transducer pairs; and
determining the cycle skip mode using, at least in part, the plurality of error values.

16. The method of claim 15 further comprising changing an arrival time detection parameter responsive to the determination of the cycle skip mode.

17. The method of claim 16 further comprising refraining from correcting measured transit time.

18. The method of claim 15 further comprising correcting the measured transit time of acoustic signals responsive to the cycle skip mode.

19. The method of claim 15 further comprising correcting the measured transit time of acoustic signals from a second measurement period responsive to the cycle skip mode of transit time from a first measurement period that immediately precedes the second measurement period.

20. A non-transitory computer-readable medium storing a program that, when executed by a processor, causes the processor to:
calculate a plurality of values, each value indicative of a pattern with respect to each transducer pair of four transducer pairs of arrival time cycle skip of transit time measurements across a measured fluid in a flow meter, the transit time measurements for both upstream and downstream transit time measurements for each transducer pair;
determine the pattern of arrival time cycle skip based, at least in part, on the plurality of values.

21. The computer-readable medium of claim 20 wherein the program further causes the processor to change an arrival time detection parameter for at least one transducer pair responsive to the pattern of arrival time cycle skip.

22. The computer-readable medium of claim 20 wherein the program further causes the processor to correct transit time values responsive to the pattern of arrival time cycle skip.

23. The computer-readable medium of claim 20 wherein the program further causes the processor to correct transit time values of a subsequent measurement period responsive to the pattern of arrival time cycle skip of transit time values in a preceding measurement period.

* * * * *